(12) United States Patent
Steele et al.

(10) Patent No.: US 7,878,140 B1
(45) Date of Patent: Feb. 1, 2011

(54) DEVICE AND METHOD TO INSURE INTEGRITY TO BODY ARMOR OR OTHER BALLISTIC PROTECTION APPARATUS

(75) Inventors: William R. Steele, Tempe, AZ (US); Paul Mark Merriman, Houston, TX (US)

(73) Assignee: Hisco, Inc., Houston, TX (US)

( * ) Notice: Subject to any disclaimer, the term of this patent is extended or adjusted under 35 U.S.C. 154(b) by 0 days.

(21) Appl. No.: 12/769,301

(22) Filed: Apr. 28, 2010

Related U.S. Application Data

(60) Provisional application No. 61/173,406, filed on Apr. 28, 2009.

(51) Int. Cl.
  G01L 5/14 (2006.01)
  G01L 23/00 (2006.01)

(52) U.S. Cl. .................................. 116/203

(58) Field of Classification Search ............. 116/203; 73/35.14, 492
  See application file for complete search history.

(56) References Cited

U.S. PATENT DOCUMENTS

| | | | |
|---|---|---|---|
| 2,601,440 A * | 6/1952 | Kerrigan | 116/203 |
| 3,136,293 A * | 6/1964 | Schmitt | 116/203 |
| 3,369,521 A * | 2/1968 | Meeder, Jr. | 116/203 |
| 4,177,751 A | 12/1979 | Rubey | |
| 4,239,014 A * | 12/1980 | Rubey | 116/203 |
| 4,361,106 A | 11/1982 | Eklof | |
| 4,519,867 A | 5/1985 | Rubey | |
| 5,242,830 A | 9/1993 | Argy et al. | |
| 5,269,252 A | 12/1993 | Nagai | |
| 5,551,279 A | 9/1996 | Quick | |
| 5,918,262 A * | 6/1999 | Sanford | 73/35.14 |
| 5,936,523 A | 8/1999 | West | |
| 5,982,285 A | 11/1999 | Bueche et al. | |
| 6,609,082 B2 | 8/2003 | Wagner | |
| 6,633,454 B1 | 10/2003 | Martin et al. | |
| 6,742,472 B1 * | 6/2004 | Shigyo | 116/200 |
| 6,848,389 B1 | 2/2005 | Elsasser et al. | |
| 6,873,524 B2 | 3/2005 | Kaczeus, Sr. et al. | |
| 7,219,619 B2 | 5/2007 | Fitzer et al. | |
| 7,262,792 B2 | 8/2007 | Shniberg et al. | |
| 7,353,615 B1 | 4/2008 | Branch | |
| 2008/0208488 A1 * | 8/2008 | Yang et al. | 116/203 |

\* cited by examiner

*Primary Examiner*—R. A. Smith
(74) *Attorney, Agent, or Firm*—Buskop Law Group, PC; Wendy Buskop

(57) ABSTRACT

A device and method to insure protection of a ballistic protection apparatus using a microtube indicator for alerting a user to inspect the ballistic protection apparatus for flaws, cracks and gaps. The device can include microtubes adapted to function as accelerometers. The microtubes can include a color containing component, a non-color containing component, and a frangible separating portion. The device can include a housing with a top surface, a window, a message, a bottom surface, parallel cuts, and an adhesive for securing the housing to the ballistic protection apparatus. A G-force impact that exceeds a preset limit can cause the color containing component to flow to the non-color containing component, thereby indicating that an excessive G-force event has occurred and that an inspection of the ballistic protection apparatus is required.

20 Claims, 4 Drawing Sheets

DEVICE AND METHOD TO INSURE INTEGRITY TO BODY ARMOR OR OTHER BALLISTIC PROTECTION APPARATUS

CROSS REFERENCE TO RELATED APPLICATIONS

The present application claims priority and benefit of U.S. Provisional Patent Application Ser. No. 61/173,406 filed on Apr., 28, 2009, entitled "DEVICE AND METHOD TO INSURE INTEGRITY TO BODY ARMOR OR OTHER BALLISTIC PROTECTION APPARATUS". This reference is hereby incorporated in its entirety.

FIELD

The present embodiments generally relate to an indicator and a process of inspection of body armor and similar ballistic protective coverings which can protect police officers, soldiers, and animals from injury, such as injury caused by cracking of ceramic components contained within the body armor or ballistic protective coverings by unexpected G-force impacts that exceed a specification threshold for the body armor or ballistic material.

BACKGROUND

A need exists for an indicator and a method usable with body armor and other similar protective materials that can detect G-forces beyond a specification limit that cause ceramic components contained within body armor or similar ballistic materials to crack, rendering the materials penetrable to a bullet and unable to protect a police officer or soldier.

Presently, soldiers or police do not have an efficient and effective method to conduct a daily inspection of the ceramic components contained within armor plates to determine if the body armor plates have been subjected to damaging G-forces. The time and cost to conduct regular inspections of the ceramic tiles within the plates in service including the loss of the assets during such inspections can be significant and prohibitive.

Digital X-ray machines in field environments are limited, expensive and in many instances not reasonably available.

A significant amount of time may elapse with the continued service of a degraded plate in the body armor, starting from the time the plate receives a potentially damaging force to the time the plate receives a more detailed inspection.

A need exists for a device and method for detecting G-force impacts that can be used in the field, can be inexpensive to install, and can be easy to remove and replace for continued service, because a plate subjected to damaging G-forces may not show external indications of internal ceramic tile damages. Damaging G-forces can crack or otherwise cause a ballistic material, such as the ballistic material used in body armor, to fail.

A need exists for an indicator integral with a ballistic material which can include a ballistic material used in an aircraft or another transport device.

A need exists for an indicator for use with wind towers and solar panels that produce electricity to alert an operator to inspect for potential cracks that may occur due to impacts on the wind towers or solar panels during a tornado or other damaging forces.

The present embodiments meet these needs.

DETAILED DESCRIPTION OF THE EMBODIMENTS

Figure 1:
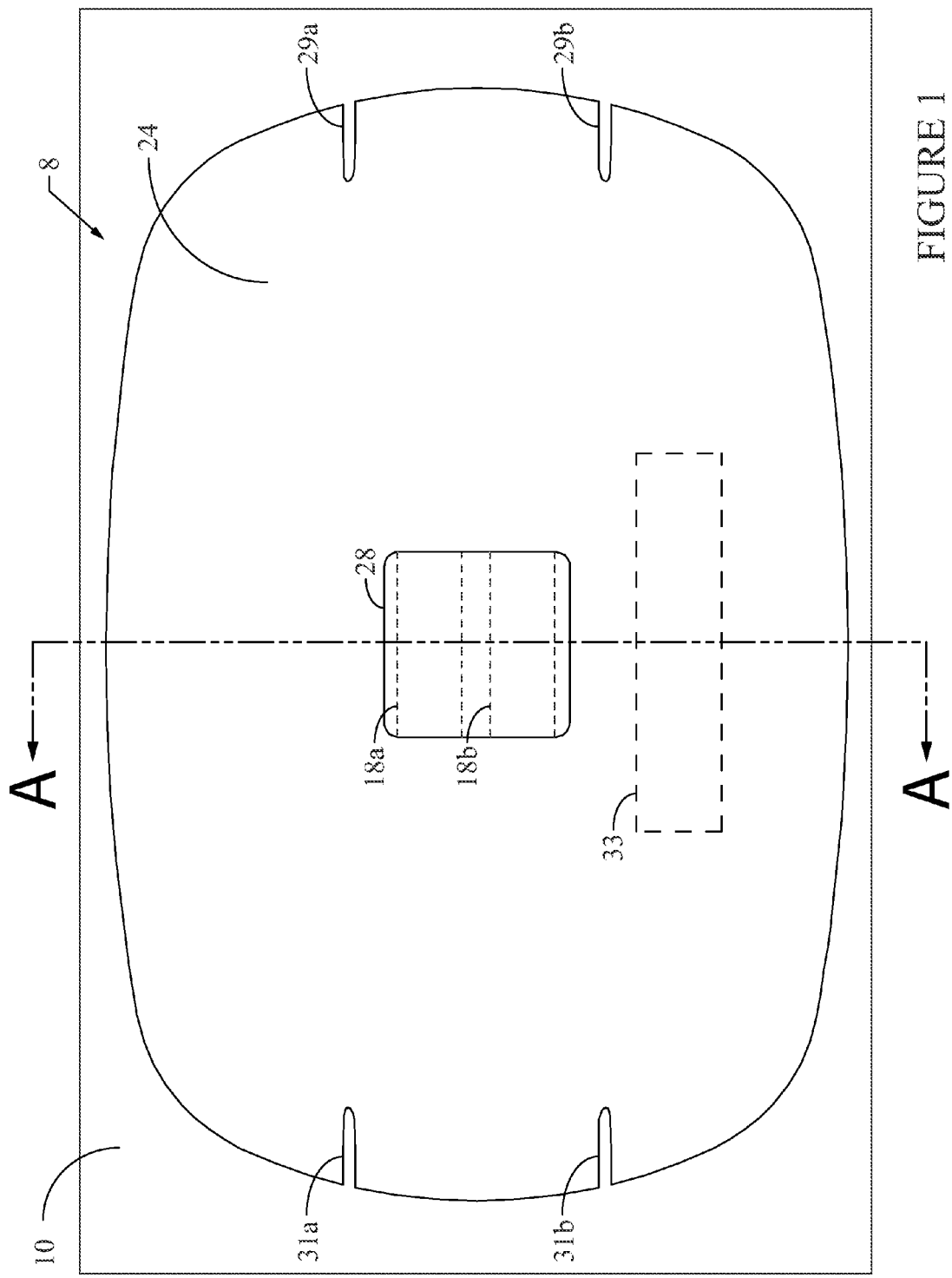
FIG. 1 is a top view of an embodiment of a housing with integral G-force indicator compartments.

Before explaining the present apparatus and method in detail, it is to be understood that the apparatus and method are not limited to the particular embodiments and that they can be practiced or carried out in various ways.

The present embodiments relate to a device and method for alerting a user, wearer or operator to the existence of cracks in body armor or similar ballistic material. The cracks can be caused by an application of excessive G-forces, such as by an impact of an object on the armor. For example, a rock can be blasted at a soldier, a soldier can fall on the body armor, or the body armor can be dropped or inappropriately handled, all of which can cause an application of excessive G-forces upon the body armor.

The indicator with ballistic material and the method for monitoring the condition of body armor and ballistic protective tiles overcomes current indicator problems. For example, current indicator designs use electrical circuits on ceramic protective tiles and are difficult to apply, can not be applied in the field, can require specialized application techniques that require training to install, and cannot be easily replaced should a fault in an electrical circuit occur or if a false positive indication should occur. All such electrical indicators can require plate disassembly for inspection and are not easily removed from the actual ceramic tile used in the protective ballistic material.

Additionally, electrical indicators can contain metal that can interfere with a soldier making accurate compass readings needed for land navigation. Typically electrical indicators can require external and specialized test equipment to make a status check of the ceramic tiles.

One or more embodiments further relate to a ballistic material with an indicator having a unique housing that can be easily removed or attached in the field.

The indicator and housing for a ballistic fabric can be non-electric and non-electronic and can prompt a viewer to visually inspect body armor or ballistic material to determine if one or more components of the body armor, such as a side piece or a breast plate of external body armor, has become damaged due to a G-force impact beyond the tolerances of the body armor or ballistic material.

One or more embodiments can provide a method for inspecting, in the field, body armor subjected to G-forces which may be otherwise unknown to the wearer or user.

The device can be significantly less expensive to make and install than current indicators with electrical circuits. Also, indicators with electrical circuits may not detect cracking in a ceramic tile or detect crack propagation if a crack occurs in an area not covered by an electrical circuit, such as on the opposite tile side, an area without a circuit overlay, or on corners.

One or more embodiments can cover G-force impact from any angle. For example, up to 360 degrees in 3-dimensions can be covered. Embodiments can also cover overlaid portions of ballistic tiles.

The indicators with the housing can be applied for the purpose of ballistic tile integrity as well as to detect damaging forces on associated equipment such as for tiles around very sensitive instruments that may need recalibration due to the excessive G-force impact.

The device and method can also include using an indicator to verify that no tampering has occurred of a "G-force" preset limit, which can alter calibration or other tuning of navigation or communication instruments.

One or more embodiments relate to a ballistic material and an indicator in a housing that can detect and provide an indicator when damaging G-forces impact a material, such as force caused by the mishandling of ceramic components contained within ballistic protective devices including: small arms protective inserts (SAPI); enhanced small arms protective inserts (ESAPI); future small arms protective inserts (XSAPI); enhanced side ballistic inserts (ESBI); and side small arms protective inserts (Side-SAPI).

One or more embodiments can include a device and method to insure integrity of a ballistic protection device which can prevent penetration from bullets, shrapnel, debris, and other lethal missiles using a ballistic material.

The device and method can include microtubes that can function as accelerometers and can be contained within a housing. One or more embodiments of the device and method can include at least two microtubes. The microtubes can be disposable micro-tubes.

Each microtube can have a color containing component, a non-color containing component and a frangible separating portion which can be disposed between the color containing component and the non-color containing components. The frangible separating portion can be adapted to collapse upon a G-force impact beyond a preset limit.

For example, the color containing component can be microspheres containing color held within a glass tube. When the G-force is applied to the substrate to which the indicators is attached, and when the G-force exceeds a specified preset limit, the microsphere walls can collapse, thereby allowing color from the color containing component to escape into the non-color containing portion of the tube. The microsphere walls can explode or implode upon the G-force impact.

In one or more embodiments, a glass microtube can have two compartments separated of a frangible portion, such as a neck portion, a channel, a passageway, or a wall. A frangible inner microtube can fracture when a G-force impacts the material near the indicators, such as the ceramic ballistic tile of a piece of outer body armor, and the color can move from a color containing section of the glass tube, past the collapsed wall, and to the non-color containing section of the glass tube.

At least two microtubes can be contained within the housing that can be made of a smooth top surface with an opening in which a window can be set. The smooth top can be formed of a material that can protect the two microtubes. The top can be made of polycarbonate. The opening can be circular, elliptical, rectangular, square, or another shape that allows viewing of the color change. The window can be an integral part of the housing in which the microtubes are contained. The housing can be made of a visually clear material that can be imprinted with an ink that allows viewing of the color condition of the visible portion of the microtubes.

Parallel cuts can be disposed opposite each other on edges of the top surface. A first set of parallel cuts can be opposite a second set of parallel cuts. The parallel cuts can allow for increased flexibility and for the placement of the housing on curved surfaces.

At least one message can be printed on a side of the top surface opposite the protected microtubes. The message can include a warning and instructions, such as "If indicator is red inspection is required."

The message can further comprise: human readable text, a paint or ink coating, a bar code, a 2D matrix code "QR", non-reflective materials, or combinations thereof.

The housing can have a bottom that can support the microtubes between the bottom and the top surface. The bottom can be a solid plate, a flexible plate, a woven basket like wire structure or a similar open weave bottom that can hold the microtubes between the top and the bottom.

The bottom can have an inner side for supporting the microtubes and an outer side for securing the housing to the ballistic material, such as by using an adhesive that can be a flexible acrylic adhesive. The adhesive can be used on the outer side of the bottom in a layer from about two mils to about ten mils in thickness.

In one or more embodiments, the housing can be from about 1.5 inches wide to less than about 1 inch long.

One or more embodiments can include embedding and/or encapsulating G-force indicators in other ceramic components used in protective armor, such as armor for soldiers or police officers. A wearer can be enabled to view the indicator and then to inspect the equipment for cracks and failures that could be penetrated by a bullet or shrapnel from explosive devices.

One or more embodiments relate to a device or method for alerting a wearer of body armor using an indicator that can be made with at least two glass tubes. Each galls tube can contain a red liquid that can be held in suspension in a first section of the tube. A second section of the tube can be the "indicating" segment.

When the indicator is subjected to an impact exceeding a specified G-force, the shock can release the highly visible red liquid into the indicating segment of the tube, which can be viewed by soldiers, police officers or other users. Then the user can take action to inspect the item, the body armor or other ballistic material. For example, a detailed examination and/or inspection, such as using a digital X-ray system, can be performed to insure that the body armor still has protection integrity and that the wearer will not be harmed by a bullet that can penetrate a crack in the now damaged body armor.

The device and method can include the use of G-force indicators that are extremely light-weight, disposable and easy to replace.

The device and method can also include using G-force indicators designed to be a one-time use disposable device that can be easily applied and replaced in both field and manufacturing environments. An adhesive can be used that can enable the indicator to be removed from the ballistic material without damaging the ballistic material.

Usable indicators in these embodiments can vary in abilities and can depend on the specification of a product to which it is applied. For example, for a product that has an operating temperate ranging from about −33 degrees Fahrenheit to about 176 degrees Fahrenheit, an indicator can be used that has an ability to operate in that temperature range.

Indicators usable in the device and method can include indicators that can be used with impacts ranging from about 25 G to about 150 G. The indicators can be sensitive to impacts occurring on the product anywhere within about 360 degrees over a 3 dimensional axis.

The G-force referred to herein can relate to an acceleration scale. A "G" is a multiple of the acceleration due to gravity (32.2 ft/s2, or 9.8 m/s2). Five (5) G's equals five (5) times the acceleration due to gravity.

The G-force indicators can be used to determine a change in velocity that causes damage to a product.

Usable indicators with this device and method can each have a "minimum G" threshold that must be exceeded before the indicator will activate.

In one or more embodiments a "minimum" G for each indicator can be determined by examining shock curves resulting from impact on the material. A "G-value" occurs where a shock curve for a product intercepts, or runs into, a defined acceleration. When "minimum G" is not exceeded, the indicator will not activate.

A custom damage boundary curve "DBC" can be determined or developed for every device to which a indicator is attached. A "DBC" can reveal what shock is required to damage a specific product. Any impact whose characteristics fall within the damage area of the DBC can be expected to cause damage to that product for which it is developed. For example, a DBC can show that an impact of 50 G at 5 ms would damage the product because that impact is within the damage area. For the same DBC curve it can show that an impact of 10 G at 5 ms would not damage the product because it is outside the damage area.

Two characteristics of a DBC can include (1) DBC's can clearly show that for all products there is a minimum acceleration, and (2) DBC's can clearly show that for all products a minimum time duration must be exceeded in order to render damage to a product with a G-force indicator.

In one or more embodiments, the indicators can be operable regardless of the angle of impact on the product.

The outer dimensions of a 100 G and a 150 G tube can be the same, such as 0.675"+/−0.010"×0.094"+/−0.002".

Two tubes can be used in each indicator to afford a 360 degree, 3-dimensional sensing area.

The tubes can be used for detecting G-force or G-loading events for any product to which they are attached. A specifically designed carrier can house the tubes for field-use, such as in the application of ballistic protective devices which use a ceramic material as one of the key components of the protective device.

Tubes usable in the housing can be made from Borosilicate glass and can contain distilled water, Lithum Chloride, Ehelyne Glycol, Epoxy, FDC Red Dye #27, or combinations thereof.

In one or more embodiments, the ballistic material with the G-force indicator can be located in a unique housing and can have numerous benefits, which can include: (1) an ability to prevent damaged products from being used by users; (2) an ability to identify potentially damaged body armor prior to deployment; (3) an ability to prevent potentially damaged ballistic material from deployment; (4) an ability to provide an immediate visual indication of possible damage to ballistic protective products; (5) an ability to identify ballistic products that should not be used until further detailed inspection can be completed; (6) an ability for easy application to new body armor; (7) an ability for easy application to existing body armor and related similar ballistic products; (8) an ability to be easily replaced if activated on a ballistic product if no damage is detected by further inspection of the product; (9) an ability to be easily applied in a field under environmental conditions by an untrained person; (10) an ability to protect fragile materials within another ballistic protective device; (11) an ability to provide evidence of mishandling of the body armor; (12) an ability to act as a visual deterrent to improper handling; (13) an ability to provide an alert to any recipient of a need for a more detailed inspection before acceptance; (14) an ability to ensure chain of accountability for all product handling; (15) an ability to reduce warranty claims for damaged goods which are actually without damage; (16) an ability to identify trouble spots in a supply chain; (17) an ability to lower production yield losses; (18) an ability to help to ensure ballistic integrity of the product; (19) an ability to increase end-user confidence in the ballistic capability of the protective device; (20) an ability to permit a daily visual inspection; (21) an ability to increase safety by helping to identify products that may not be able to fully stop a ballistic threat due to previous damage, and may not meet the intended product design requirement; (22) an ability to increase caution and care with handling and use; (23) an ability to screen and identify products that should be removed from service for a more detailed inspection; (24) an ability to reduce the cost of ownership due to increased awareness of specific product-handling procedures and related fragility of ceramic components; and (25) an ability to provide a product that is extremely lightweight and does not interfere with the normal application, use or service of the ballistic device to which it is attached.

In one or more embodiments the tubes can contain photo-luminescent color when microcapsules in the tubes break upon application of a G-force that exceeds a preset limit related to the G-force tolerances of the associated body armor or ballistic material.

In one or more embodiments the device and method can be used to detect cracks in body armor generated by multiple G-force impacts.

Excessive G-forces can cause the ceramic components of ballistic material, which is supposed to prevent injury, to fragment and crack. For example body armor can fragment and crack when a heavy object lands or falls on the body armor or if a soldier jumps out of a plane, and instead of landing on his feet, landed on his ballistic material or device.

The device and method can be used with all forms of body armor where ceramic components are a part of the armor, such as body armor that meets the National Institute of Justice Threat level III, and National Institute of Justice Threat level IV.

One advantage of the present invention is that it can be used without any training and without any electrical power source. A user can easily pull out the indicator, which can be integrally placed into the ballistic material, and view a change in color of the indicator to see if the user should inspect the integrity of the body armor because of an impact that exceeded a G-force limit of the indicator.

Embodiments can further provide a indicator that can be applied to all kinds of ballistic materials, such as by adhesive, epoxy, sewing or by weaving.

The indicator can be applied to any substrate. The bonding material can be a flexible fabric or solid material. The indicator can be secured to the ballistic fabric using a high performance acrylic based adhesive that can aggressively bond to flexible conformable low surface energy fabrics.

The combination of indicator and housing can provide a long-lasting device with enhanced chemical resistance and increased stability against ultraviolet degradation while providing protection by sensing inadvertent G-force impact of a damaging nature.

One or more embodiments can include the formation of a ballistic material with an indicator that can be used to cover wind turbine backings, tents, other military ceramic based protection devices, and structures. The ballistic material can be used to cover objects in hurricane and tornado prone areas that need protection from wind blown debris. Embodiments can also be used to provide a screen-like rigid protection that inhibits bullet penetration or other ballistic impacts which need to be inspected.

An acrylic based adhesive can be used to attach the indicator to the ballistic material, such as an acrylic adhesive called SCAPA UP2040, made by SCAPA of Connecticut. Cold adhesives can be directly cast onto the ballistic material.

An additive can be mixed into the acrylic adhesive prior to application to the fabric, such as a flame retardant. For example, Nomex, made by DuPont of Delaware, can be added in amounts ranging from about 0.1 percent to about 25 percent by weight of the adhesive.

Other components, such as antioxidants, flexibility enhancers, plasticizers, or combinations thereof can be added to the adhesive formulation. The additives can be added in amounts ranging from about 0.1 percent to about 5 percent by weight of the total adhesive formulation.

A clear acrylic, a fabric with an adhesive, and a single layer of adhesive film can attach the indicator to an object.

The adhesive layer can also help retard a bullet's travel through the fabric, providing better protection to soldiers, law enforcement officials, and others.

The acrylic adhesive can be spread on the fabric in a thickness ranging from one mil to about ten mils.

Two different acrylic adhesives can be used. The first acrylic adhesive can be applied to the fabric and the second acrylic adhesive, having a slightly different composition, can be applied to the first acrylic adhesive, to provide two different physical property characteristics to the material. For example, the second adhesive can contain a small amount of urethane, such as up to about 10 percent by weight.

The material and the indicator can be made with an automated, generally computer driven process, wherein fabric can be unwound from spools or bolts of fabric on a machine at a rate ranging from about 100 feet per minute to about 1000 feet per minute. The adhesive can be cast or rolled on the fabric automatically and the indicator can then be applied to the fabric.

One or more embodiments of the device and method can enable the production of the ballistic material at a rate ranging from about 100 feet per minute to about 1000 feet per minute.

The housing with indicators can be applied to most pieces of military equipment where there is a need to monitor certain levels of G-force or G-loading due to impact of objects that can exceed a level in which damage may occur to the object to which the indicator is attached and in which damage may otherwise be undetected until the product undergoes further inspection or fails to perform its designed function.

The fabric can then be cut into bolts or rolls, which can then be cut into one or more desired roll sizes.

The flexible ballistic material with the indicator can be applied to a base substrate, such as a body armor substrate, which can be made from fiberglass, graphite composite, similar materials, or open cell foam padding disposed on either side of a hard, bullet resistant, impenetrable substrate. The flexible ballistic material with the indicator can be applied to a base substrate and can form a padded, water resistant body armor that can be comfortable to wear but tough and durable in a corrosive environment. The indicator can detect damaging forces at a magnitude associated with damage to the ceramic portion of the ballistic protective material.

The ballistic material of the device and method can be used in the presence of sand such as in the desert, or in the presence of high velocity flying particles or similar rough materials, such as a soldier moving against a wall or rough jagged metal. The ballistic material of the device and method can resist tearing, gouging or disintegration of the ballistic material in harsh environments and conditions.

The device and method can include a ballistic material having a total thickness of about 19 mils, which can include an adhesive thickness of about 2 mils and a fabric thickness of about 15 mils.

The adhesive can be a clear adhesive, which can pass a peel adhesive test using PSTC method #101 of Illinois—at 180 degrees initial to SS (20 min @RT) which yields at 32 inches per ounce and a holding power using PST Method #107 at 178 degrees of 23.2 PSI (1 inch×1 inch×1000 g) at RT, which was greater than 24 hours for holding the G-force indicator to the fabric.

One or more components of outer body armor can be created by using the ballistic material and an indicator made using the present device and method.

The ballistic material with the indicator can be disposed over a base structure of a substrate, such as a ceramic, a fiberglass, other durable crystalline polymers, or a graphite composite, and can be created and sandwiched between two foam layers made from different materials. The two foam layers can include a soft layer to contact with a soldier's body and an outer layer to support deflection of bullets and resist impacts of blunt instruments, such as rocks, rifle butts, shrapnel, debris, or fists of militant people.

The ballistic material, once applied to the substrate and foam combination, can be sealed, such as heat sealed with a torch, to prevent water or other materials from entering through seams in the fabric.

Turning now to the figures, FIG. 1 shows a top view of an indicator housing 8 with ballistic material 10 of a ballistic protection apparatus.

A top surface 24 is shown with a window 28. Through the window 28, non-color containing components 18*a* and 18*b* can be seen.

Two pairs of parallel cuts, including a first pair of parallel cuts 29*a* and 29*b* and a second pair of parallel cuts 31*a* and 31*b* can be in the top surface 24.

A message 33 can be on the top surface 24, which can be a warning message or indicator.

Figure 2:
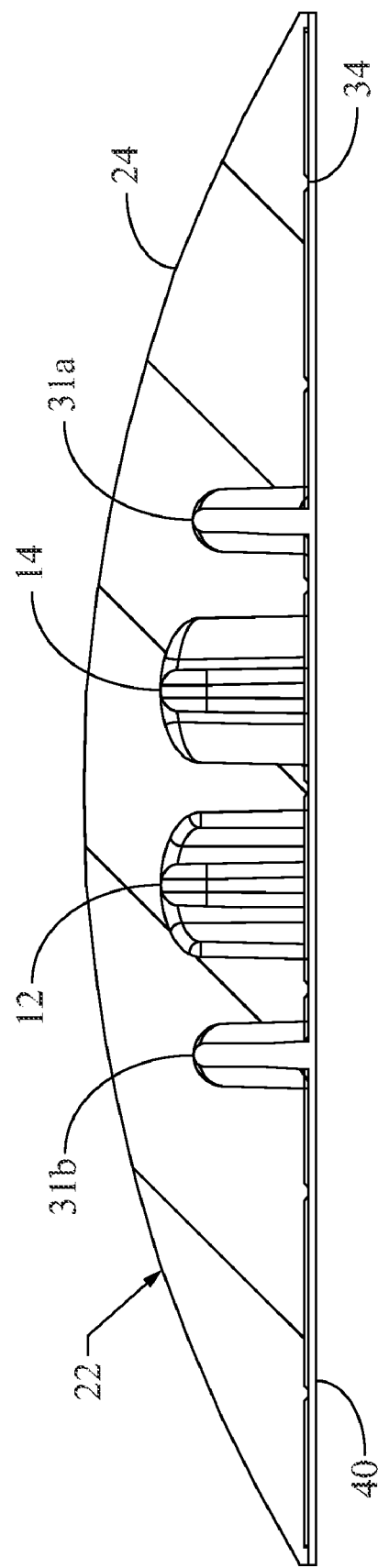
FIG. 2 is a cross sectional view of an embodiment of the indicator on a ballistic fabric.

FIG. 2 shows a cross sectional side view of a housing 22 with the top surface 24, a first cavity 12 for a disposable microtube, and a second 14 cavity for a disposable microtube in the housing 22.

A layer of adhesive 40 can be disposed on a bottom surface 34 of the housing 22 for removably fixing an indicator to the ballistic material. The width of the top surface 24 can be about 1 inch.

Figure 3:
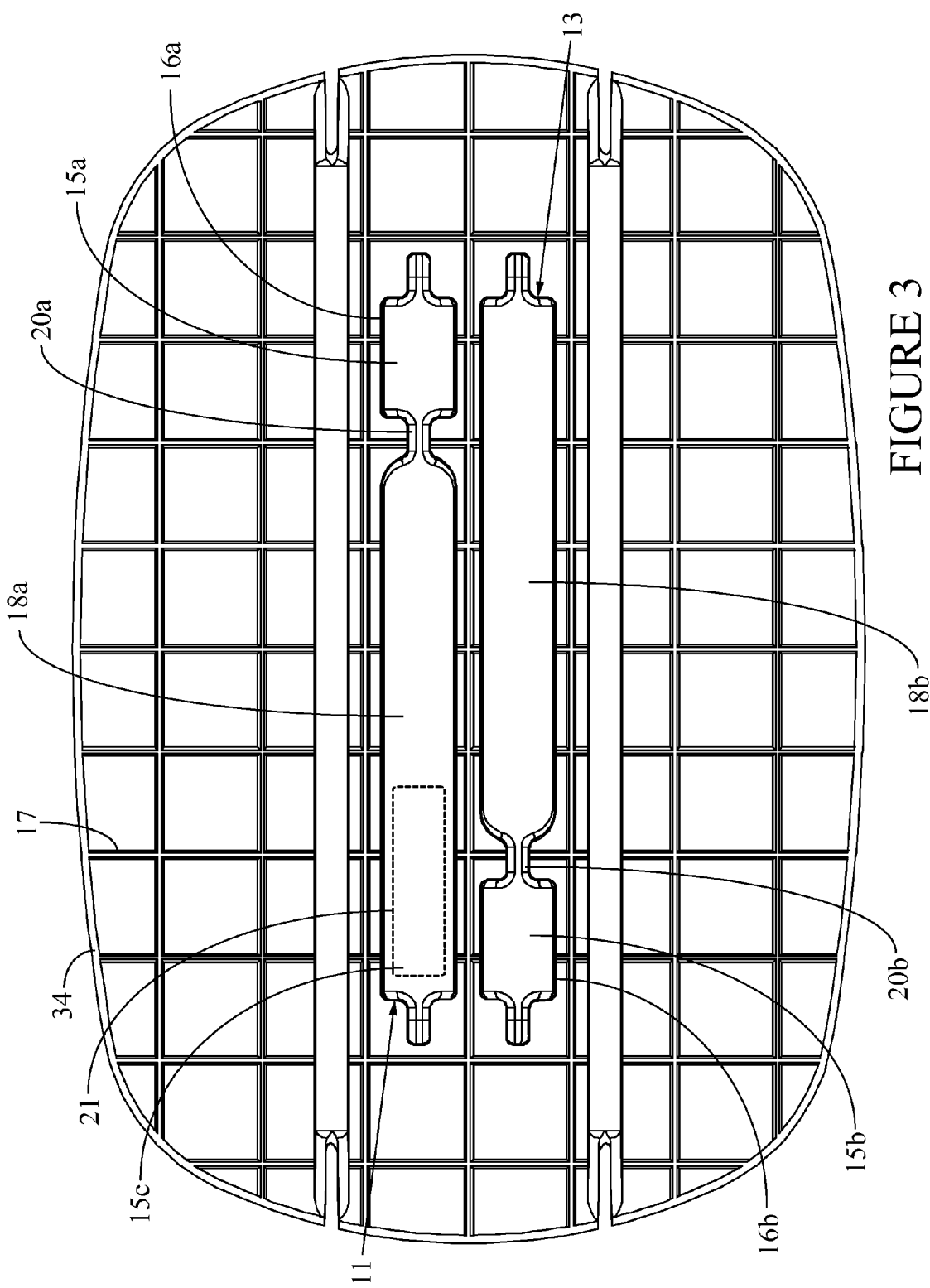
FIG. 3 shows a view of a bottom surface of the housing.

FIG. 3 shows a top view of a bottom surface 34. A first microtube 11 can be disposed in the first cavity 12, and a second microtube 13 can be disposed within the second cavity 14.

The microtube cavities with the microtubes 11 and 13 can include compartments 16*a* and 16*b* each including a color containing component 15*a* and 15*b*.

A first frangible separating portion 20*a* and a second frangible separating portion 20*b* are depicted.

The bottom surface 34 can include raised edges, such as raised edge 17.

An additional inner microtube 21 can contain color component 15*c*.

Figure 4:
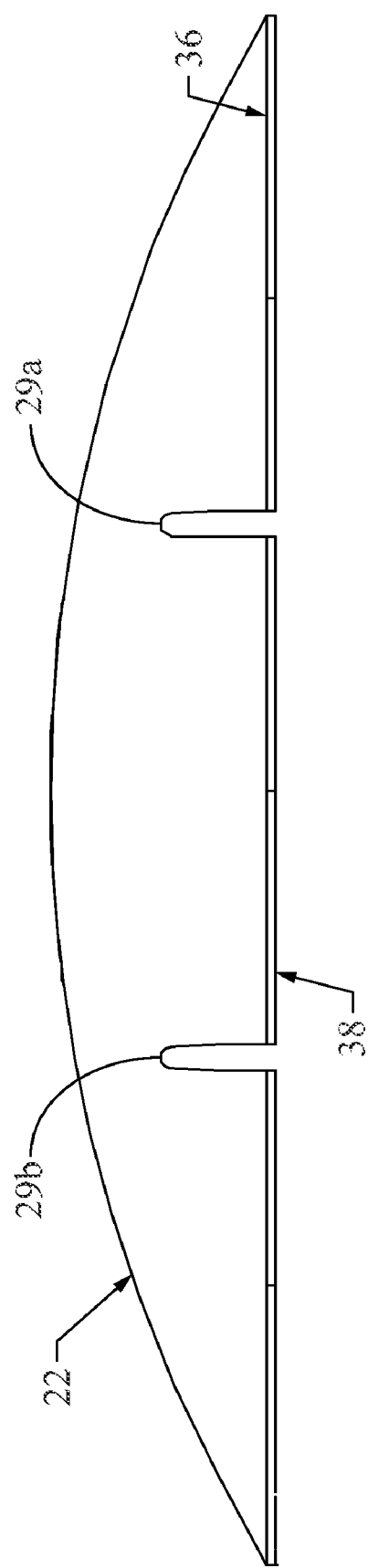
FIG. 4 shows a detail of an edge of the housing.

FIG. 4 shows the housing 22 with a detail of an edge of the housing. The first pair of parallel cuts 29*a* and 29*b* along with the inner side 36 and the outers side 38 of the bottom surface.

While these embodiments have been described with emphasis on the embodiments, it should be understood that within the scope of the appended claims, the embodiments might be practiced other than as specifically described herein.

What is claimed is:

1. A device to insure integrity of a ballistic protection apparatus which prevents penetration from bullets, shrapnel, debris, and other lethal missiles, wherein the device comprises:

a. a ballistic protection device comprising at least one ceramic ballistic component;
b. at least two microtube cavities, wherein each microtube cavity contains a disposable microtube that is adapted to function as an accelerometer, wherein each disposable microtube comprises a color containing component, a non-color containing component, and a frangible separating portion disposed between the color containing component and the non-color containing component, and wherein the frangible separating portion is adapted to collapse upon a G-force impact that exceeds a preset limit; and
c. a housing comprising:
  i. a top surface comprising an ultraviolet radiation inhibitor disposed thereon and a window for displaying each non-color containing component, and wherein the top surface is adapted for supporting at least one message;
  ii. a bottom surface for supporting each disposable microtube between the bottom surface and the top surface, wherein the bottom surface comprises an inner side and an outer side;
  iii. two pairs of parallel cuts disposed on opposite sides of the top surface to allow for up to five degrees of conforming flexibility in the top surface and the bottom surface; and
  iv. a flexible adhesive disposed on the outer side of the bottom surface for removably securing the housing to the ballistic protection apparatus, and wherein upon application of the G-force impact that exceeds the preset limit, the color containing component flows to the non-color containing component, thereby indicating that an excessive G-force event has occurred and that an inspection of the ballistic protection apparatus is required.

2. The device of claim 1, wherein the color containing component further comprises microspheres of color that upon the application of the G-force impact that exceeds the preset limit the microspheres of color flow into the non-color containing component upon the frangible separating portion fracturing.

3. The device of claim 1, wherein each microtube further comprises an additional inner microtube containing the color containing component within the non-color containing component, wherein the inner microtube fractures upon application of the G-force impact that exceeds the preset limit allowing the microspheres of color in the color containing component to enter the non-color containing component, and wherein the non-color containing component is coated and oriented to be viewable through the window.

4. The device of claim 1, wherein the at least one message comprises a member of the group consisting of:
  a. human readable text;
  b. a paint or ink coating;
  c. a bar code;
  d. a 2D matrix code (QR);
  e. a non-reflective material; and
  f. combinations thereof.

5. The device of claim 1, wherein the housing is one and one half inches wide and less than one inch long.

6. The device of claim 1, wherein the flexible adhesive is a flexible acrylic adhesive resistant to degradation or reduced bonding in the presence of hydrocarbons, other harsh materials, harsh environmental conditions, or combinations thereof.

7. The device of claim 1, wherein the at least one ceramic ballistic component is a ceramic ballistic tile, a ceramic metal matrix composite, a ceramic composite, or combinations thereof.

8. The device of claim 1, wherein the disposable microtubes monitor G-force impacts from any direction.

9. The device of claim 1, wherein the bottom surface is an integral component of the top surface, and wherein the bottom surface further comprises a plurality of raised ridges interconnected with the top surface to provide an increased surface area for the flexible adhesive, thereby providing a secure bond between the housing and the ballistic protection apparatus.

10. The device of claim 1, wherein the top surface is rounded to prevent the housing from dislodging from the ballistic protection apparatus when impacted by another article.

11. The device of claim 1, wherein the flexible adhesive enables the housing to be removable and replaced on the ballistic protection apparatus while in the field.

12. The device of claim 1, wherein the window is of a size that enables a viewer to perceive a color in the non-color containing component in less than 3 seconds under multiple lighting conditions.

13. The device of claim 1, wherein the window and top surface are an integral one-piece material, thereby ensuring a watertight seal around each disposable microtube and providing encapsulation of each disposable microtube.

14. The device of claim 1, wherein the microspheres of color comprise a pigment adaptable to be viewed by night vision equipment, and usable in night conditions, day conditions, foggy conditions, twilight conditions, cloudy conditions, bright sunlight conditions, or combinations thereof.

15. A device to insure integrity of a ballistic protection apparatus which prevents penetration from bullets, shrapnel, debris, and other lethal missiles, wherein the device comprises:
a. a ballistic protection device comprising at least one ceramic ballistic component;
b. at least one microtube adapted to function as an accelerometer, wherein each microtube comprises:
  i. a color containing component;
  ii. a non-color containing component;
  iii. a separating portion disposed between the color containing component and the non-color containing component, wherein the separating portion is adapted to collapse upon a G-force impact that exceeds a preset limit; and
c. a housing secured to the ballistic protection apparatus, the housing comprising:
  i. a top surface comprising a window for displaying each non-color containing component;
  ii. a bottom surface for supporting each microtube;
  iii. at least one cavity for containing the at least one microtube; and
  iv. at least one cut disposed on the top surface to allow for flexibility of the top surface and the bottom surface, wherein upon application of the G-force impact that exceeds the preset limit the color containing component flows to the non-color containing component, thereby providing an indication that an excessive G-force event has occurred and that an inspection of the ballistic protection apparatus is required.

16. The device of claim 15, wherein the color containing component further comprises microspheres of color that upon the application of the G-force impact that exceeds the preset limit the microspheres of color flow into the non-color containing component upon the separating portion fracturing.

17. The device of claim 15, wherein the at least one ceramic ballistic component is a ceramic ballistic tile, a ceramic metal matrix composite, a ceramic composite, or combinations thereof.

18. A device to insure integrity of a ballistic protection apparatus which prevents penetration from bullets, shrapnel, debris, and other lethal missiles, wherein the device comprises:
   a. a ballistic protection device comprising at least one ceramic ballistic component;
   b. at least one microtube adapted to function as an accelerometer, wherein each microtube comprises:
      i. an outer microtube comprising a non-color containing component; and
      ii. an inner microtube comprising a color component, wherein the inner microtube is disposed within the outer microtube, wherein the inner microtube is adapted to fracture upon application of a G-force impact that exceeds a preset limit, thereby allowing the color component to enter the non-color containing component and providing an indication that an excessive G-force event has occurred and that an inspection of the ballistic protection apparatus is required; and
   c. a housing secured to the ballistic protection apparatus, the housing comprising:
      i. a top surface comprising a window for displaying each non-color containing component;
      ii. a bottom surface for supporting each microtube;
      iii. at least one cavity for containing the at least one microtube; and
      iv. at least one cut disposed on the top surface to allow for flexibility of the top surface and the bottom surface.

19. The device of claim 18, wherein the at least one ceramic ballistic component is a ceramic ballistic tile, a ceramic metal matrix composite, a ceramic composite, or combinations thereof.

20. The device of claim 18, wherein the color component comprises a pigment.

* * * * *